April 13, 1943.   A. A. KOTTMANN ET AL   2,316,171
SLICING MACHINE
Filed March 6, 1939   6 Sheets-Sheet 4

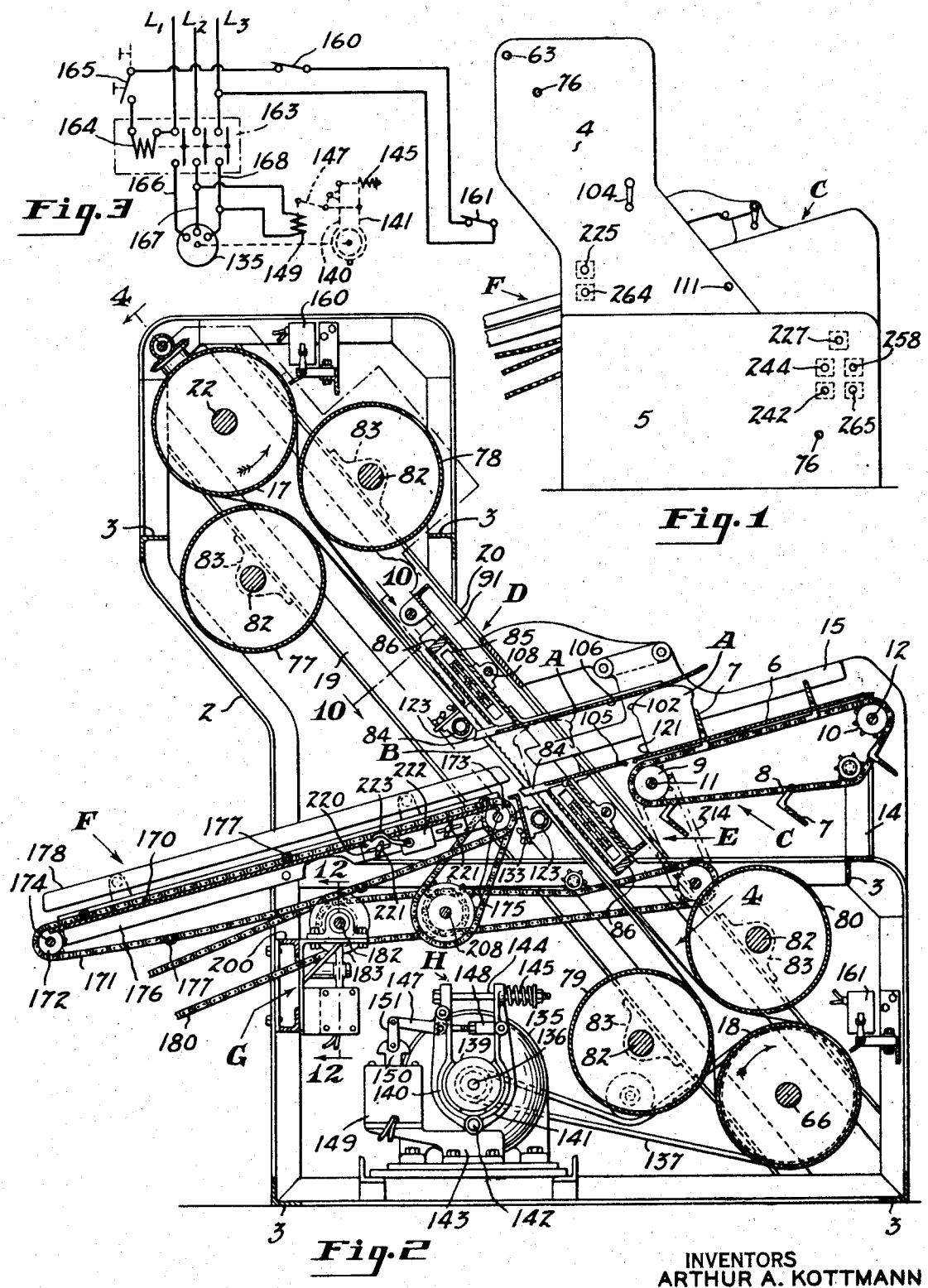

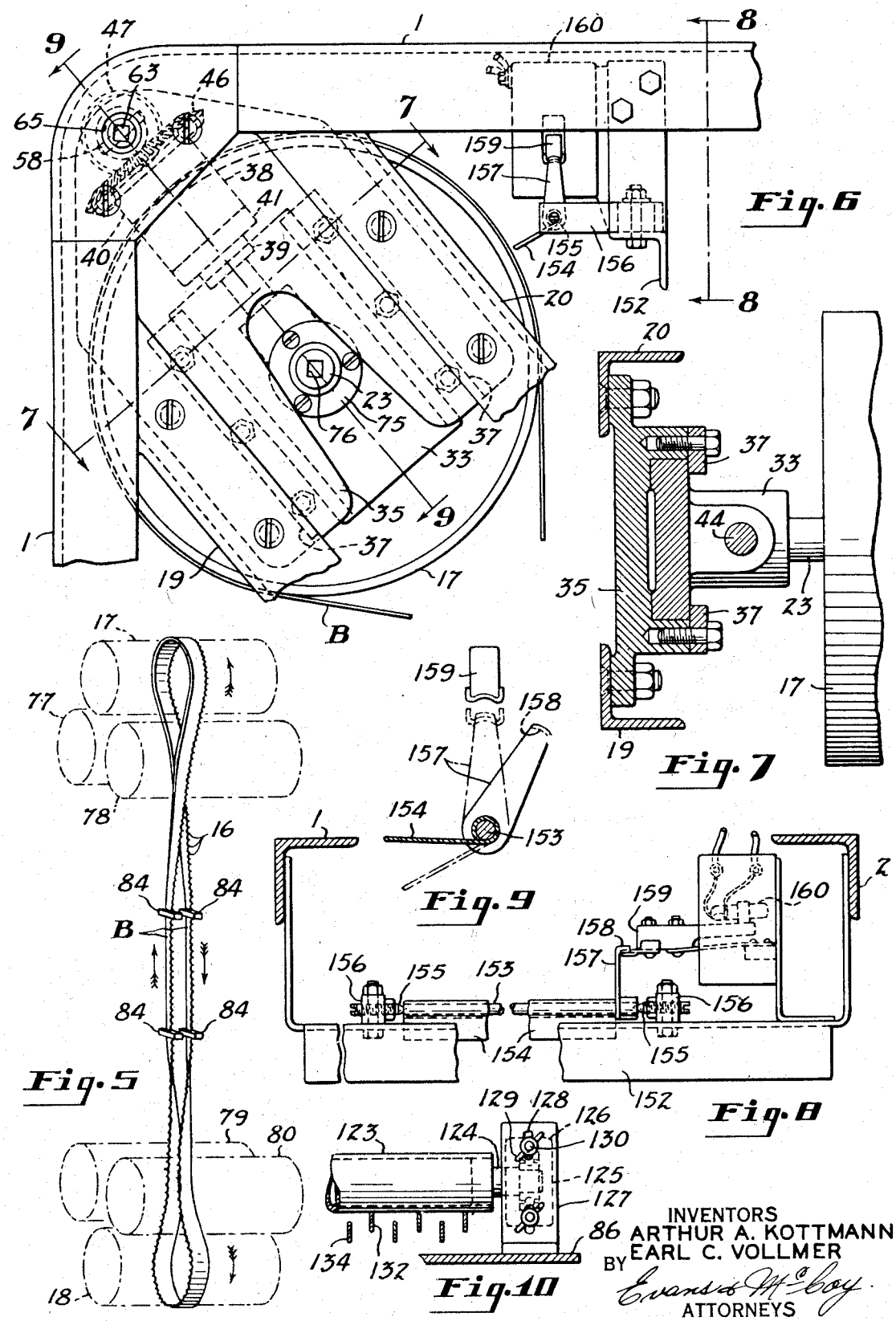

INVENTORS
ARTHUR A. KOTTMANN
EARL C. VOLLMER
BY Evans McCoy
ATTORNEYS

April 13, 1943.     A. A. KOTTMANN ET AL     2,316,171
SLICING MACHINE
Filed March 6, 1939         6 Sheets-Sheet 5

INVENTORS
ARTHUR A. KOTTMANN
EARL C. VOLLMER
BY
ATTORNEYS

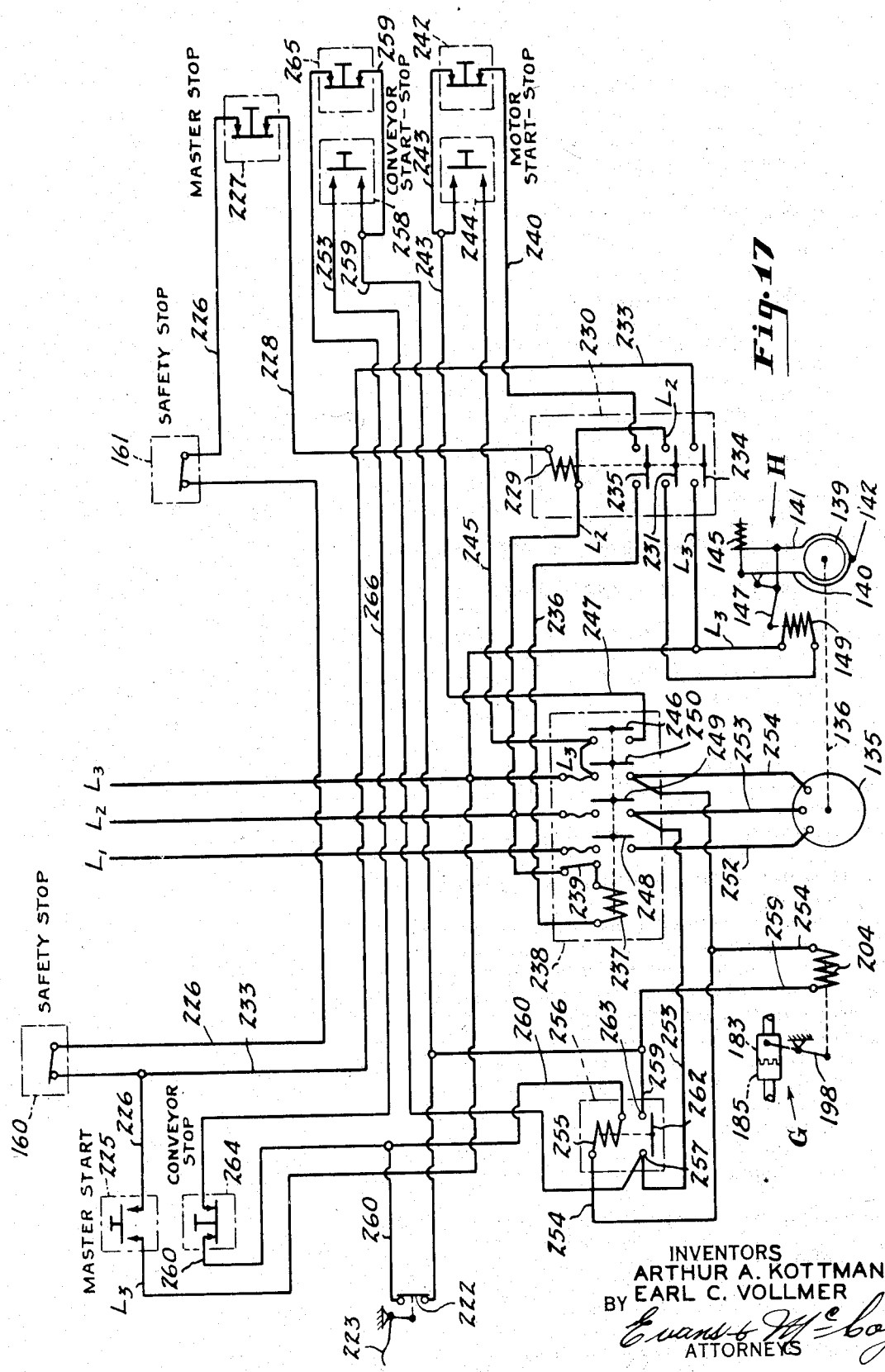

Patented Apr. 13, 1943

2,316,171

UNITED STATES PATENT OFFICE 2,316,171

SLICING MACHINE

Arthur A. Kottmann, Davenport, Iowa, and Earl C. Vollmer, Rock Island, Ill., assignors, by mesne assignments, to The Bettendorf Company, a corporation of Maryland Application March 6, 1939, Serial No. 260,046

21 Claims. (Cl. 146—88)

This invention relates to slicing apparatus and more particularly to bread slicing machines of the character employing a multiplicity of endless cutter bands.

It has long been recognized that slicing or cutting machines having endless cutter bands are superior to machines using blades or cutters which are reciprocated. There have been many machines designed and built which employ endless cutter bands and with some degree of success. However, there are numerous structural and operating difficulties which have not heretofore been entirely overcome, and, accordingly, most of the bread slicing machines now in use are of the reciprocating type, which have been perfected to a high degree, and although bakers would generally prefer a band type machine for slicing their product, the band blade slicer has not as yet come into general usage. It is, therefore, an object of the invention to provide an improved band type slicing machine of relatively simple design and construction and which is economical to manufacture.

One reason for the perfection and commercial success of reciprocal blade slicing machines is the fact that all of the cutting blades thereof may be disposed and actuated so that their cutting edges lie in approximately a common plane without undue stresses in the blades which would materially shorten the lives thereof. Hence, each article, as it is advanced into the cutting mechanism, to be sliced, is engaged by all of the cutters at approximately the same time. Thus, the cutting action takes place in a relatively short distance so that the confining of the article during slicing is readily accomplished. In slicing machines having endless cutter bands, the several runs of the bands are not normally disposed with their edges in a common cutting plane, so that it is often more difficult to guide and confine the article while the slicing takes place. Attempts have been made to design band type slicing machines in which some of the runs of the endless cutter bands are displaced by means of guides so that substantially all of the runs are disposed in approximately a common plane. Previously, such constructions have resulted in unequal twisting of the different laps or runs of the bands and unequal wear on the guides employed to receive and space the runs of the bands and define the slicing zone. By maintaining the free or unsupported portions of each of the several runs of the bands of substantially equal length, it has been found that the twisting stress imposed on the bands is more uniformly distributed and the wearing of the guides is materially reduced.

Accordingly, another object is to provide a slicing machine employing a multiplicity of endless cutter bands of substantially equal length which are carried on spaced rotatable members and in which the laps or runs of the bands are co-extensive in length with one another and approximately parallel. Specifically, the present invention aims to provide a slicing machine of this character in which the two laps of each band cross one another and are twisted into spaced parallel cutting planes in the region of a slicing zone midway between the rotatable band blade supporting members or elements, the blades or bands being mounted so that the unsupported portions of the runs of the bands (in which the twisting of the bands occurs) are of substantially equal length between the slicing zone and each of the rotatable supporting elements.

Bakers who use slicing machines are generally desirous of marketing their products with different slice thicknesses, so that a slicing machine to be completely acceptable in the market should be adjustable to slice articles to various thicknesses. Furthermore, the size or height of articles to be sliced is not uniform and since it is preferable to confine the articles from above and below during the slicing operation, the blade spacing mechanism for adjusting the slice thickness should be associated with the means for supporting and holding down the articles during slicing. Another object, therefore, is to provide in an endless band type slicer means for spacing and guiding the runs of the cutters in combination with means for confining the articles during the slicing thereof, and in which the distance between the confining means can be varied while the machine is in continuous operation so as to adjust the same for articles of different size.

The invention further contemplates improvements in the control of the articles and cutter bands during the slicing operation so that the articles are advanced into the cutters in such position that deflection and weaving of the blades is minimized and a more uniform and even slicing action occurs and the slices of the product are relatively free from waviness or other irregularities; improvements in the drive mechanism and the controls therefor which quickly arrest the movement of the bands and driving elements in the event of breakage of one of the bands; improvements in the mechanism for tensioning the bands around the rotatable supporting elements or members to maintain a substantially uniform tension of predetermined amount in all the cutter bands; improvements in the controls of the driving means which actuates the conveyor for feeding articles into and through the slicing mechanism and in the controls of the driving mechanism for the endless cutters to coordinate the same and prevent the forcing of an article or articles into the cutters unless the latter are in motion. Other objects and advantages will become apparent from the following detailed description of a suitable embodiment of the invention which is made in connection with the accompanying drawings, in which:

Figure 1 is a diagrammatic side elevation, with parts broken away, showing the general plan of the machine and the location of various controls and adjustments;

Fig. 2 is a vertical sectional view, taken longitudinally through the machine;

Fig. 3 is a wiring diagram showing one method of connecting the safety switches, drive motor, and brake of the machine;

Fig. 5 is a diagrammatic illustration showing the position of one of the endless cutter bands around the end drums and between the guide drums and the manner in which the band is twisted so that the runs thereof are positioned in spaced parallel cutting planes with the cutting edges of the runs facing in the same direction;

Fig. 6 is a detail showing the manner in which the upper blade supporting drum or element is mounted, and the location of the upper safety switch;

Fig. 7 is a sectional detail taken substantially on the line 7—7 of Fig. 6;

Fig. 8 is a foreshortened detail view partly in section and with parts broken away, taken substantially on the line 8—8 of Fig. 6;

Fig. 9 is a diagrammatic detail, partly in section, showing the displacement of the trip lever of the safety switch;

Fig. 10 is a fragmentary detail in section showing the mounting of the upper blade backing or supporting roller, taken substantially on the line 10—10 of Fig. 2;

Fig. 17 is a wiring diagram showing a preferred system of electrical connections for the control of the machine.

Figure 4:
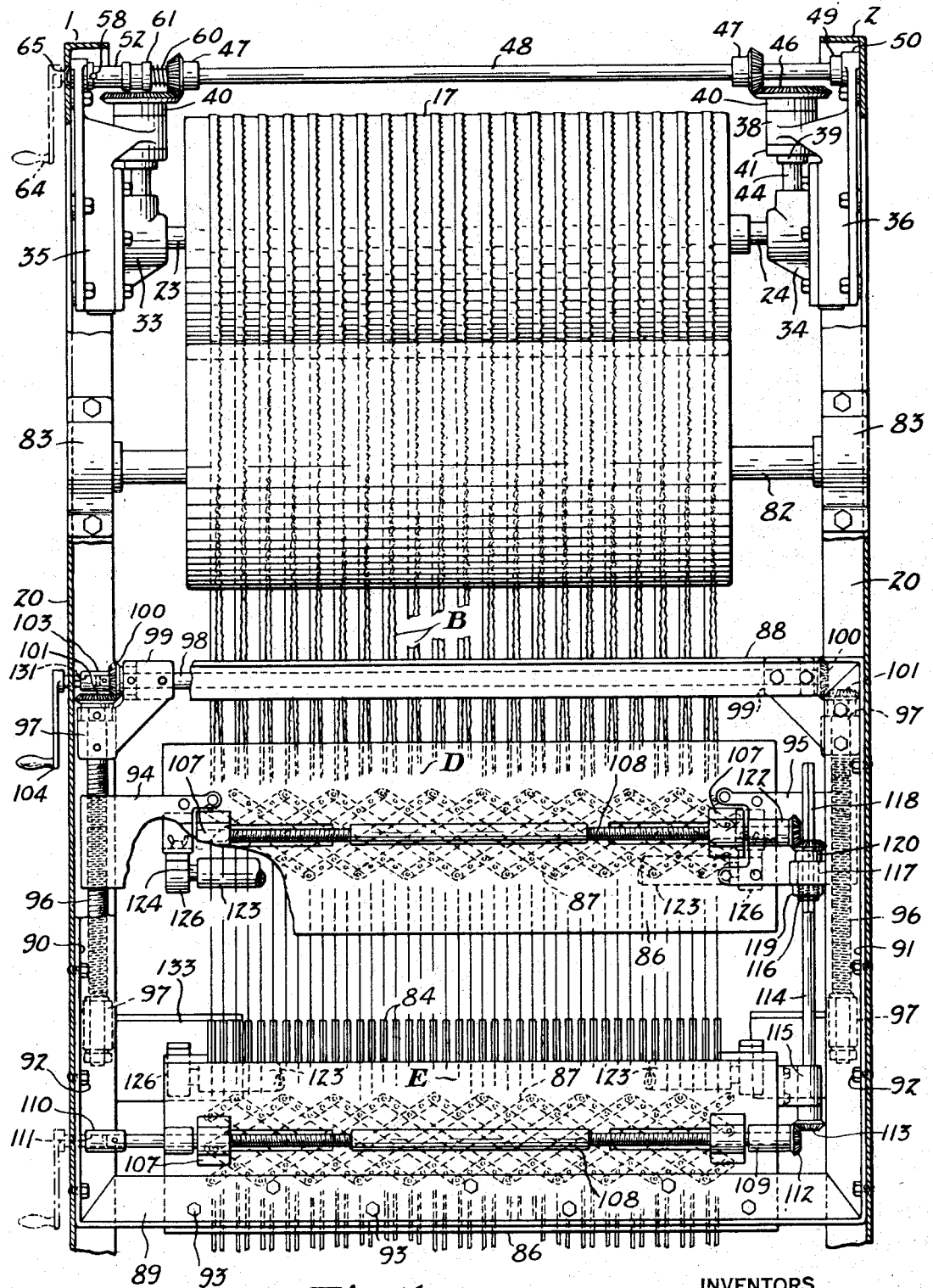
Fig. 4 is a fragmentary view, partly in section and with parts broken away, taken substantially on the line 4—4 of Fig. 2, and enlarged with respect thereto.
Figure 11:
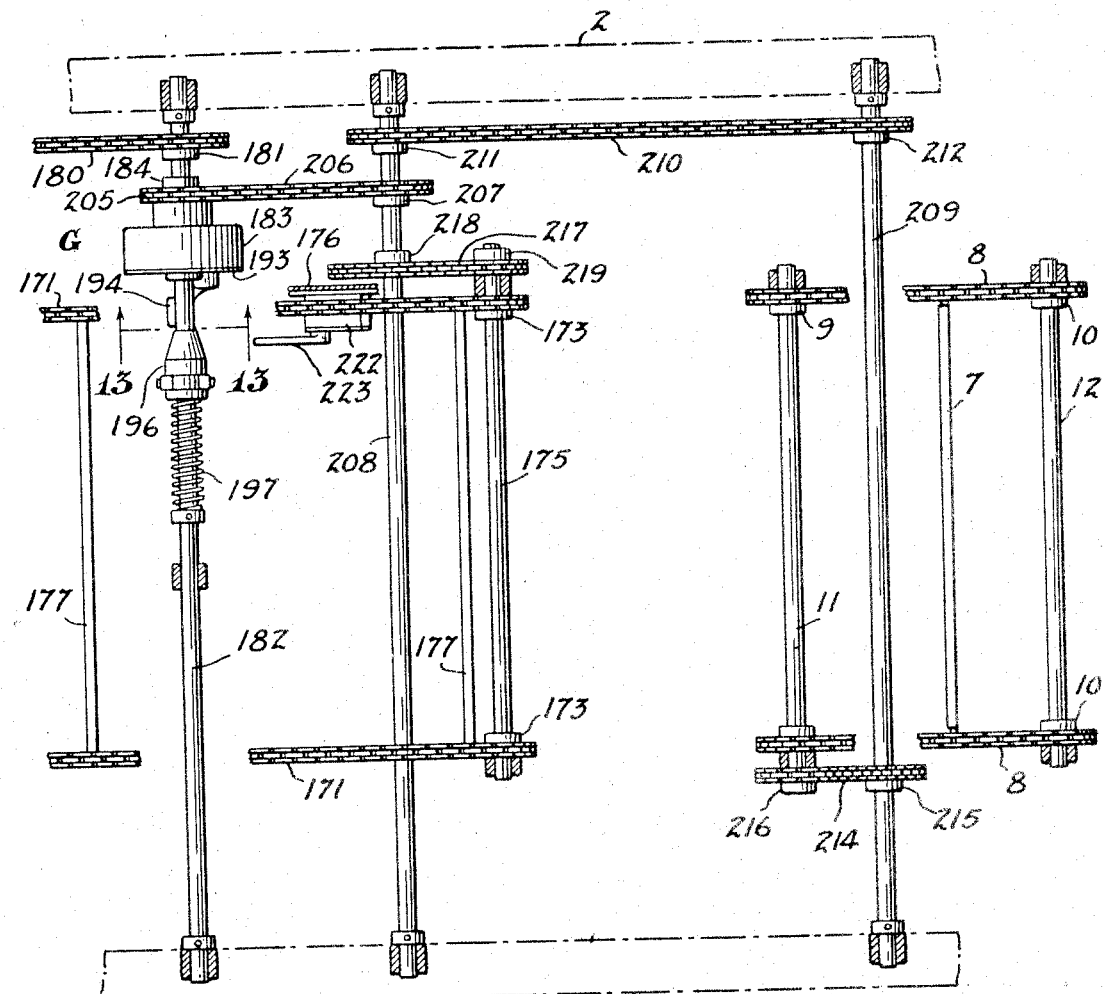
Fig. 11 is a diagrammatic illustration in plan showing the drive for the conveyors of the slicing machine.

In describing the illustrated invention, reference will be made to the accompanying drawings by letters and numerals which indicate like parts throughout the several views. Articles A, such as loaves of bread, which are to be sliced, are advanced into the cutters or blades B by an infeed or loading conveyor C. Upper and lower blade guides or spacers D and E, respectively, are provided to adjust the distance between adjacent laps or runs of the cutters B and to guide the same, as well as to confine the articles during slicing. The sliced articles are received by an outfeed or discharge conveyor F which carries the articles away from the cutters B and forwards the same to another operating instrumentality, such for example as a wrapping machine. The drive for the conveyors C and F is through a clutch structure or arrangement G and a brake arrangement H is provided to control the movement of the cutters B so that the same may be quickly stopped in case of accident or breakage.

A suitable supporting structure is provided for the several parts and assemblies of the machine and may comprise side frames 1 and 2 which, in the present instance, are constructed of angle irons or bars. The side frames are held in spaced substantially parallel relation with respect to one another by a number of cross members 3. If desired, side panels 4 and 5 may be provided to enclose the operating mechanism. These panels may be hingedly connected to the side frames so that the mechanisms may be readily exposed for inspection and such adjustment as cannot be made while the enclosing panels are shut. Other enclosing panels (not shown) may be provided to extend between the side frames 1 and 2, and these panels also may be hingedly connected to the supporting structure.

The infeed conveyor C comprises an inclined apron or table 6 which supports the articles A as they are advanced into the slicing mechanism. A plurality of upstanding flights 7 carried between side belts or chains 8, move over the table 6 and engage the rear side of articles to advance the latter. The side belts 8 are carried around spaced rotatable elements 9 and 10 mounted on shafts 11 and 12 respectively, supported by supplementary frame members 14 which are closer together than the side frames 1 and 2 but which constitute part of the main supporting structure.

Preferably the infeed conveyor C is part of an infeed conveyor system, commonly known in the trade as a block infeed such as that disclosed in the Petskeyes Patent No. 2,131,256. In such case the conveyor C corresponds to the flight feed portion of the conveyor system shown in the Petskeyes patent (table 155, flights 157). Therefore, the apron 6 is preferably disposed at such an angle that gravity assists the movement of the articles A into the slicing mechanism.

At the sides of the infeed conveyor C are spaced parallel guides 15 which engage the ends of the articles A to center the articles with respect to the cutting mechanism.

The cutters B comprise a multiplicity of relatively thin flexible endless cutter bands which are formed of fine quality spring steel and have a series of sharp scallops or serrations 16 formed along one edge. These blades are carried around spaced parallel cylinders or drum members 17 and 18 which are mounted in the supporting structure in a manner to be later described. These drums have smooth cylindrical surfaces which extend from side to side of the machine so that the cutter bands may move axially thereover as the spacing of the bands is altered by the guide mechanisms D and E. Between the drums 17 and 18 the bands B are given a half twist (Fig. 5) so that they cross one another substantially midway between the drums to present the cutting scallops or serrations 16 of both runs of each band toward the oncoming loaf. The twisting and crossing of the bands presents the flat sides thereof toward one another midway between the drums 17 and 18, and by means of the mechanisms D and E the central portions of the blade runs are spaced, twisted and guided into substantially parallel equidistant cutting planes.

At each side of the machine and forming a part of each of the side frames 1 and 2 is a pair of diagonally disposed framing members 19 and 20 which are in spaced parallel relation with respect to one another and serve as supports for the top and bottom drums 17 and 18, respectively. A stationary shaft 22 extends through the top drum 17 and is supported by spindles 23 and 24 which are received in sockets 25 formed in the ends of the shaft 22. Ball bearing assemblies, indicated at 26, rotatably mount the drum 17 on the shaft 22. The inner races of the ball bearing assemblies seat on reduced diameter portions 27 of the shaft 22 and the outer races of the assemblies are received in hubs 28 formed on heads 29 of the drum. Cap members 30 secure the bearing assemblies in the hubs and are provided with oil sealing rings 31.

The spindles 23 and 24 are carried by slide members 33 and 34, respectively, which are adjustably supported by brackets 35 and 36 disposed at the opposite sides of the slicing machine and between the frame members 19 and 20 adjacent the upper ends of the latter. As shown in Fig. 7 the members 33 and 34 have sliding engagement with the brackets 35 and 36, respectively, and are held in place by gibs 37. The movement of the members 33 and 34 is confined by the brackets and gibs so that it is in a rectilinear path such as to carry the drum 17 toward or away from the drum 18 (and approximately in the plane of the free or unsupported portions of the blade runs as will later appear).

Inwardly extending journal bosses 38 formed on the brackets 35 and 36 rotatably receive sleeves 39. The sleeves 39 are held against endwise movement by integral collars 40 which seat against the upper sides of the journals 38 and by rings 41 which are secured on projecting portions of the sleeves and seat against the lower sides of the bosses 38. Internally threaded bores 43 threadedly receive the increased diameter threaded ends of rods 44, the lower ends of which are received in the slide members 33 and 34 and secured in place by pins 45.

Figure 16:
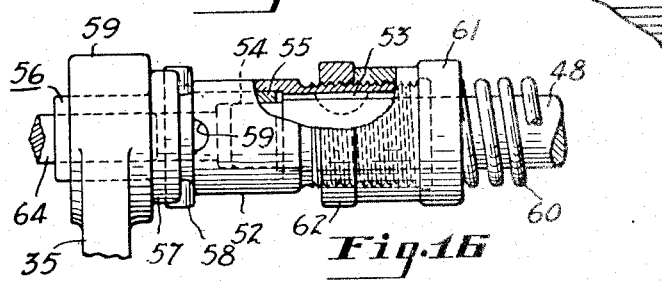
Fig. 16 is a fragmentary detail, with parts broken away, showing the overload release for the blade tension adjustment.

On the upper ends of the sleeves 40 are secured bevel gears 46 which mesh with bevel gears 47 carried by a shaft 48 extending transversely across the top of the machine. One end of the shaft 48 is journalled in upper portion 50 of the bracket 36, being held against endwise movement by a collar ring 49. The opposite end of the shaft 48 is received within one end of a sleeve 52, being longitudinally slidable therein but held against relative rotative movement by a key 53 (Fig. 16). A reduced diameter portion 54 on this end of the shaft 48 is rotatably received within the sleevelike end 55 of a ratchet element 56 which is journalled in an upper portion 59 of the bracket 35. The sleeve 55 of the ratchet member is also embraced by the sleeve 52 and rotatable therein, this arrangement imparting increased strength to the structure. The sleeve 52 normally is in circumferential seating engagement with an integral collar or flange 57 formed on the ratchet member 56. A transverse pin 58 extends through the ratchet member, being centered at the parting line between the flange 57 and the end of the sleeve 52. Curved recesses 51 (Fig. 16), in the end of the sleeve 52 that embraces the portion 55 of the ratchet member, receive the ends of the pin 58 so that when the sleeve 52 is held against the flange 57 of the ratchet member and the pin 58, both the sleeve and the ratchet member rotate as a unit, such rotative movement being imparted to the shaft 48 through the key 53. The sleeve 52 is normally held against the flange 57 and in locking engagement with the pin 58 by means of a helical compression spring 60 which is received on the shaft 48 between one of the bevel gears 47 and an adjusting collar 61 which is threaded on the sleeve 52. A locking ring 62 is provided to secure the collar 61 on the sleeve 52 in adjusted position.

Figure 14:
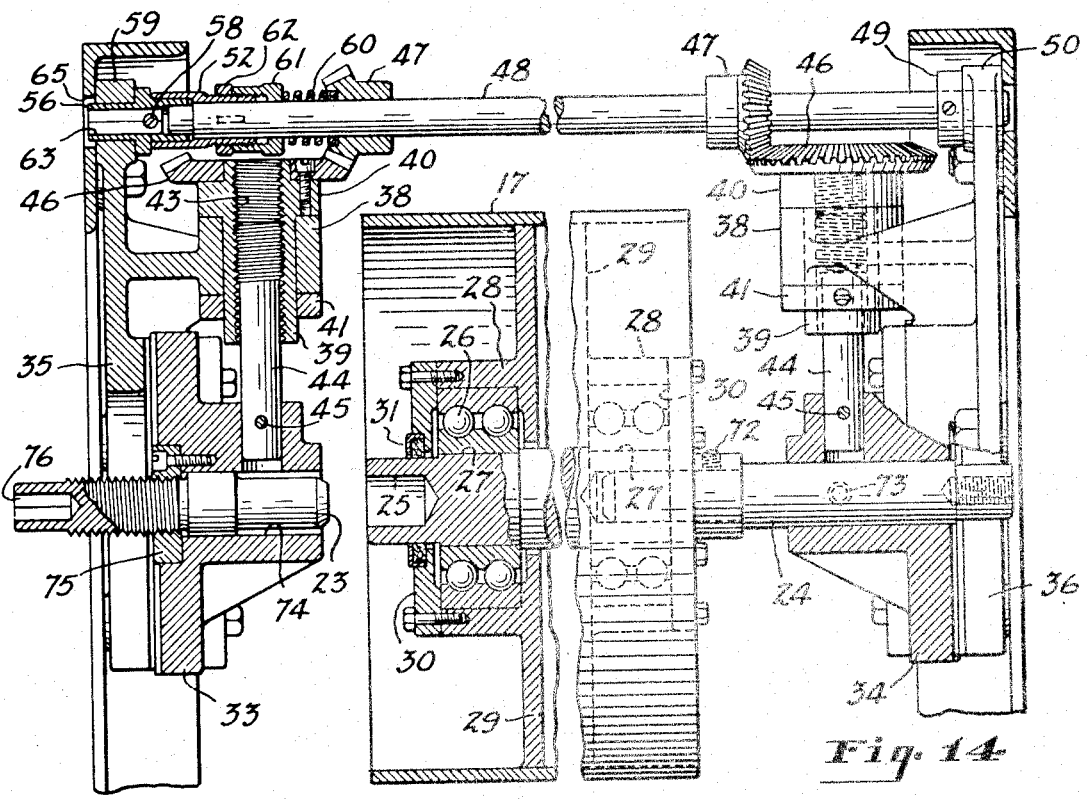
Fig. 14 is a fragmentary foreshortened transverse sectional view showing the supporting structure for the upper blade holding element or drum and the means for adjusting the same.

As shown in Fig. 14, the ratchet member 56 is provided with a squared hole 63 which receives a suitable crank 64 (Fig. 16) inserted through an aperture 65 in the side frame of the machine. Rotation of the ratchet member 56 by means of the crank 64 thus imparts rotation to the shaft 48 through the pin 58 and sleeve 52. Accordingly, the sleeves 39 at the opposite sides of the machine are rotated in synchronism through the gears 46 and 47 so as to simultaneously move the slide members 33 and 34 and adjust the upper drum 17 toward or away from the lower drum 18 while maintaining a parallel relation between the drums. Upon an increase in the torque transmitted through the ratchet member 56 to the shaft 48, over a predetermined amount, the pin 58 rides out of the recesses 51 because of their curved sides, forcing the sleeve 52 to the right as viewed in Fig. 16 and compressing the spring 60. Continued rotation of the ratchet member 56 by means of the crank 64 is thus ineffective to further rotate the shaft 48. In this manner a safety feature is provided in the machine which makes it impossible for an operator thereof to tighten the blades B to more than a predetermined tension. Such tension may be adjusted by movement of the adjusting collar 61 on the sleeve 52. As the collar 61 is moved to the right, as viewed in Fig. 14, to increase the compression of the spring 60, the torque which can be transmitted through the ratchet member 56 and pin 58, without slipping, is increased, while movement of the adjusting sleeve to the left decreases the maximum transmissible torque. Preferably, the mechanism is set so that the tension maintained in each of the cutter bands B is in the neighborhood of from about 50 to about 75 pounds.

The lower drum 18 is of similar construction to the upper drum 17 and has extending therethrough a stationary shaft 66 which corresponds to the shaft 22 for the drum 17 and on which the drum is mounted by means of ball bearing assemblies similarly to the manner in which the drum 17 is mounted on the shaft 22. The ends of the shaft 66 are bored to provide sockets 71 which receive spindles 67 and 68 which correspond to the spindles 23 and 24 previously mentioned. These spindles are mounted in stationary bracket members 69 and 70 which are secured to the lower ends of the framing members 19 and 20 at the opposite sides of the machine.

Figure 15:
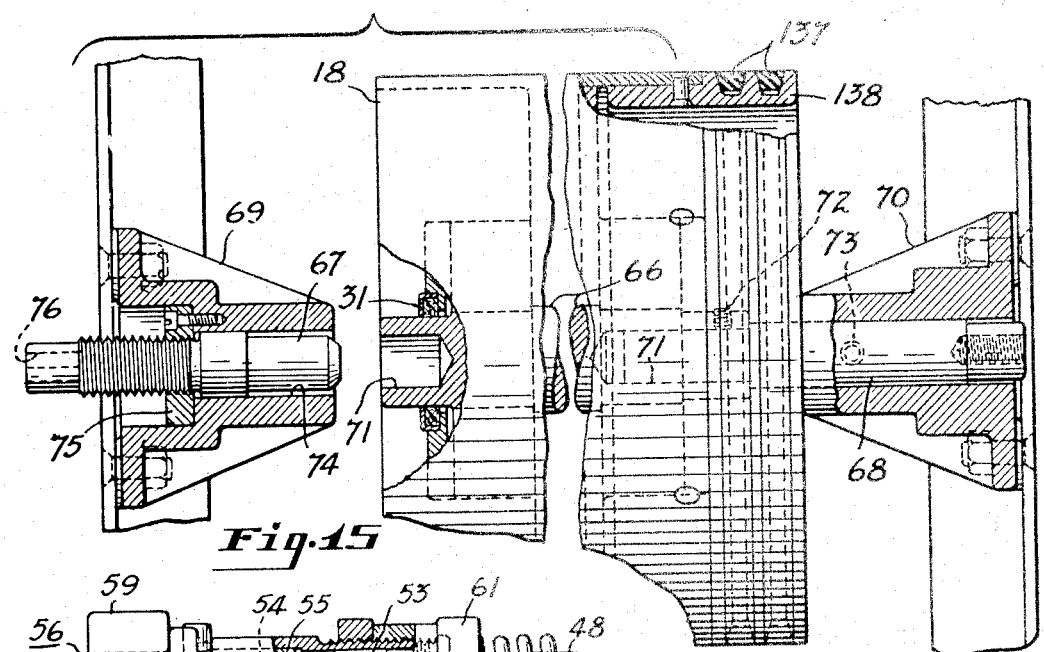
Fig. 15 is a fragmentary foreshortened transverse sectional view showing the supporting structure for the lower blade supporting member or drum.

Set screws 72 in the stationary shafts 22 and 66 prevent rotation of the shafts on the spindles 24 and 68, and the spindles are secured against rotation in the brackets 34 and 70 by means of pins 73. The spindles 23 and 67 at one side of the machine are axially slidable in bores 74 of the slide member 33 and bracket 69, so as to be retractable from the sockets 25 and 71 of the stationary shafts. Nuts 75 are secured to the slide member 33 and bracket 69 in alignment with the bores 74 thereof and have threaded engagement with threaded portions 81 of the spindles. Square holes or sockets 76 are provided in the outer ends of the spindles 23 and 67 to receive a suitable crank so that the spindles may be rotated and withdrawn from the sockets 25 and 71 as shown in Figs. 14 and 15. When the spindles are thus withdrawn from the stationary shafts the drums 17 and 18 are supported by the spindles 24 and 68 which are of sufficient strength to carry the drums in cantilever fashion, thus permitting the endless cutter bands B to be placed around the drums over the ends thereof as will be later described.

Adjacent the upper drum 17 and in parallel relation therewith is a pair of guide drums 77 and 78 which are also in parallel relation with respect to one another. A second pair of guide drums 79 and 80 are disposed adjacent the bottom drum 18 in parallel relation therewith and in parallel relation with one another. The guide drums 77, 78, 79, and 80 are preferably of substantially the same diameter as the end drums 17 and 18 and are carried by transverse shafts 82 which are journalled in brackets 83 secured to the frame members 19 and 20. These guide drums are all of cylindrical form with continuous surfaces like the end supporting drums 17 and 18 and extend transversely across the machine so that the cutter bands can move laterally thereover in axial directions, similarly to the movement of the bands over the supporting drums 17 and 18, as the spacing of the bands is altered.

The guide drums 77 and 80 are arranged to deflect the runs of the cutters B which move downwardly toward a plane which passes through the rotational axes of the drums 17 and 18. Likewise, the guide drums 78 and 79 are arranged to deflect the upwardly moving runs of the bands B toward the same plane. In this manner both the upwardly and downwardly moving runs of all the bands are disposed in approximately a common plane which passes through the stationary shafts supporting the end drums which carry the bands. It is to be noted that the length of the band runs between the guide drums 77 and 80 is equal to the length of the band runs between the drums 78 and 79, or substantially so. Also, the unsupported portions of all the band runs between each of the guide drums and the adjacent spacing and guiding mechanisms are of substantially the same length. Thus the free or unsupported portions of the bands in which the twisting thereof occurs are all of substantially the same length and located in homologous positions with respect to the path of the articles through the cutters.

The cutting zone of the bands into which the articles A are fed is located substantially equal distances from both sets of the end and guide drums. Above and below such zone the runs of the bands are received by slotted fingers 84 of the upper and lower blade spacing and guiding mechanisms D and E, respectively, which form the subject matter and are more fully described in co-pending patent application of Earle C. Vollmer and Frederick A. Herwehe, Serial No. 260,044, filed March 6, 1939. Briefly, each of the blade spacing mechanisms D and E comprises a plurality of elongated guide members 85 which individually carry the slotted fingers 84 and are supported in a housing 86. The several guide members 85 have elongated slots which receive pins of lazy tongs 87 whereby the guide members may be uniformly expanded or contracted upon actuation of the lazy tongs.

In accordance with the present invention a unique arrangement is provided for mounting the upper and lower blade guiding and spacing mechanisms in the slicing machine. This mounting includes a supplementary frame comprising spaced parallel cross members 88 and 89 and spaced parallel connecting members 90 and 91 which extend between the cross members and are in turn secured to the frame members 20 on opposite sides of the slicing machine.

The support housing 86 of the lower blade guide mechanism E is secured by bolts 93 to the cross member 89 of the supplementary frame while the support housing 86 for the upper blade guiding mechanism D is carried by bracket extensions 94 and 95 which have their ends threadedly received on threaded rods 96 rotatably mounted in journals 97 secured to the connecting members 90 and 91. Paralleling the cross member 88 and adjacent thereto is a shaft 98 rotatably mounted in journals 99 and having secured thereon bevel gears 100 which mesh with bevel gears 101 secured on the upper ends of the threaded rods 96. One of the gears 100 is provided with an axially directed extension 103 having a square socket formed therein which receives a crank 104 from the outside of the machine frame so that the shaft 98 may be manually rotated to simultaneously rotate the threaded rods 96. The threads on these rods and in the extensions 94 and 95 are arranged so that upon rotation of the shaft 98, the upper blade spacing mechanism is moved toward or away from the lower blade spacing mechanism E while maintaining parallel relation with respect thereto so as to vary the size of the slicing zone.

A plate member 105 is secured to the housing 86 of the bottom spacing mechanism E to engage the underside of articles A moving into the slicing mechanism and support the same after they move beyond the end of the conveyor apron 6. The plate member 105 is, accordingly, disposed so that its supporting surface is substantially in line with the supporting surface of the conveyor apron. An article holddown or top guide 106 is secured to the support housing 86 of the upper blade spacer D and is disposed above the plate member 105 and conveyor apron 6 and in spaced parallel relation thereto. This holddown engages the tops of articles moving into the cutters to guide and confine the same during feeding and slicing.

An important feature of the invention is the positioning of the drums for supporting and guiding the endless cutter bands, with respect to the table 6 and plate 105 of the infeed conveyor, so that, as the articles are advanced into the cutting mechanism initial engagement thereof with the cutting bands occurs along the lower forward edges of the articles. Baked loaves of bread frequently have what is known in the trade as "overproof," indicated at 102 in Fig. 2, which is caused by the dough rising above the top of the tin during the baking process. Such overproof is usually formed with a relatively hard, stiff crust of irregular shape as compared with the bottom edge corners of the loaf such as bottom leading edge 121. Accordingly, the slicing machine of the present invention is constructed so that the bands B first enter the lower leading edge corner 121 of each of the loaves, as indicated by the broken line position of an article in Fig. 2. In order to avoid the overproof 102 and enter the lower leading corner 121 of an article first, the runs of the bands B are disposed so that the plane of the cutting edges thereof is disposed at an obtuse angle with respect to the article support members 6 and 105 which engage and support the articles as they are advanced into the cutters. The specific angle at which the cutters should be set with respect to the infeed conveyor members is not critical, but is limited by certain practical factor. For instance, if the blades are at substantially 90° to the support 105, the blades are very likely to strike the overproof 102 before the lower corner 121. The overproof being of irregular character and tougher than the lower corner, would be likely to deflect the blades, resulting in irregular or wavy slicing. Therefore, the blades B should be set at an angle appreciably greater than 90° to the support 105, such, for example, as an angle of 100°. As the angle between the cutters and the article support on the approach side of the cutters is increased beyond 90°, the length of the portions of the cutter bands between the guide fingers 84 is increased. The greater the length of such unsupported portions of the cutters the less control thereover. Therefore, in order to obtain optimum efficiency in slicing, to produce slices which are free from irregularities and waves, the obtuse angle between the cutters and the article support should not be excessive. For example, it is preferable if the angle be less than about 130°. A satisfactory angle for the plane of the cutting edges of the blades relative to the article support on the approach side of the blades has been found to be in the neighborhood of about 115°, as shown in Fig. 2. This angle insures the entering of the lower leading corners 121 of the loaves before entering the overproof 102, so that the blades are guided by the article as the overproof is being cut, and at the same time the angle is not so great that the length of the unsupported cutters between the guides 84 is excessive.

As previously mentioned, the table 105 of the infeed conveyor is disposed at an incline so that the movement of the articles thereover into and through the slicing mechanism is assisted by gravity. Therefore, in order to maintain the obtuse angle between the blades and article support of the infeed conveyor the plane of the free runs of the band, which is also the plane of the axes of the drums 17 and 18, is disposed at an oblique angle to the horizontal, which will decrease as the angle of incline of the infeed conveyor is increased. A suitable angle for the plane for the free runs of the blades has been found to be in the neighborhood of 50°, so that the angle of the infeed conveyor supports 6 and 105 is in the neighborhood of about 15°. In addition to obtaining improved slicing, the positioning of the bands B at an oblique angle to the horizontal materially lowers the overall height of the machine which is an important factor since the distance between the drums 17 and 18 should be about six feet in order to obtain sufficient length in the free runs of the bands in which the twisting thereof occurs.

Blocks 107 are threadedly received on the oppositely threaded ends of shafts 108 extending across the support housings 86 of the spacing mechanisms and rotatably mounted in journals 109 secured to the housings. These blocks have projections which extend through elongated openings in the housings 86 and are connected to opposite ends of the lazy tongs 87. One end of the shaft 108 of the bottom blade spacer is provided with an element 110 having a square socket 111 to receive a crank, indicated by broken lines of Fig. 4, so that the shaft may be manually rotated externally of the machine. The opposite end of the shaft 108 of the lower blade spacer has secured thereon a bevel gear 112 which meshes with bevel gear 113 secured on the lower end of an upwardly extending rod or shaft 114 journalled in a bearing 115 mounted on an end of the lower support housing 86. The upper end of the rod 114 is longitudinally slidable but non-rotatably received in a sleeve 116 journalled in a boss 117 on the bracket extension 95. For example, the rod 114 may be splined or have a square end 118 which slides within the sleeve 116, the latter being held against endwise movement by a collar 119 and a bevel gear 120 which abuts against the boss 117. The gear 120 meshes with a gear 122 secured on the adjacent end of the oppositely threaded shaft 108 of the upper blade spacing mechanism D. Thus by means of the bevel gears 112, 113, 120, and 122, and the shaft or rod 114, the oppositely threaded rods 108 of both upper and lower blade spacers may be simultaneously actuated so as to maintain a uniform spacing between the various runs of the cutter bands. Thus the latter operate in substantially parallel cutting planes between the upper and lower guide fingers 84. The above mentioned simultaneous adjustment of the guide fingers 84 may be effected regardless of the spacing between the upper and lower blade guide mechanisms. Because of the sliding engagement which the upper gear sleeve 116 has with the actuating rod 114, the present invention thus provides a blade spacing and guiding arrangement in which the blade guides on one side of the slicing zone may be moved toward or away from the other while the slicing mechanism is in continuous operation and also provides a guiding arrangement wherein the spacing of the cutters may be adjusted regardless of the relative positions of one set of guiding fingers with respect to the other set of guiding fingers, all of the adjustments of the spacing mechanisms being accomplished from without the frame of the machine so as to avoid the possibility of injury to the operator thereof.

Adjacent the ends of the slotted guide fingers 84 of each of the blade guiding mechanisms is disposed a roller bar 123 which engages the back or non-cutting edges of the bands B. These roller bars are made of hard wear-resistant material such as steel and have reduced diameter spindles 124 projecting from their ends, which spindles are rotatably mounted in ball bearing assemblies 125 (Fig. 10) mounted in journal members 126. The journal members 126 for the roller bar of the upper guide mechanism are supported by brackets 127 secured to the support housing 86. Elongated slots 128 in the brackets 127 and wing nuts 129 on studs 130 (which are secured in the journal members 126) provide adjustment so that the upper roller bar 123 may be disposed to engage the back edges of the downwardly moving runs 132 only of the bands B (see Fig. 10). The roller 123 adjacent the guide fingers 84 of the lower blade spacer is adjustably supported by a cross member 133 mounted between the side frames of the machine. This lower roller bar is adjusted, similarly to the manner in which the upper bar is adjusted, so as to engage the upwardly moving runs 134 only of the cutters B. In this manner each run of all the bands is engaged intermediate the spaced guide drums by one of a pair of transversely disposed parallel roller bars which prevent displacement of the bands in the direction of article movement through the cutters during the slicing operation. Whereas in the machines of the character contemplated by the present invention it is important that adjacent runs of the cutter bands move in opposite directions in order to provide an improved slicing operation, it is also important to guide and support the rear or non-cutting edges of the cutter bands against displacement by the articles as they are forced through the machine. Therefore, while both the upwardly moving and downwardly moving runs of the bands are deflected into approximately a common plane as pointed out above, yet there is a sufficient crossing of the alternate runs so that in the region of the roller bars 123 only one set of the runs contacts each of the roller bars, permitting each of the bars to rotate under the influence of the runs with which it is in frictional engagement.

An electric motor 135 is mounted in the base of the machine, supported between the side frames 1 and 2, and has on one end of its shaft 136 a pulley which carries belts 137 trained over a pulley 138 (Fig. 15) secured in one end of the bottom blade drum 18. In this manner the bands B are actuated through frictional engagement with the lower drum 18. As viewed in Fig. 2, the drum 18 rotates in a clockwise direction and the movement of the bands B actuates the opposite end drum 17 in a counterclockwise direction. The intermediate pairs of spaced parallel guide drums are also actuated through frictional engagement with the several runs of the bands.

On the end of the motor shaft 136 opposite the pulley which carries the belts 137 is mounted a brake wheel 139 which is partially embraced by a pair of brake shoes carried by brake arms 140 and 141 pivoted at 142 on a stationary bracket 143 secured to the motor base. The brake arms 140 and 141 have extensions which are normally drawn together by means of a rod 144 and a helical compression spring 145, the rod 144 passing freely through an aperture in the end of the brake arm 141.

A bell crank lever 147 is pivoted to the arm 140 and is connected to the arm 141 by an adjustable length link 148, so that by pivotal movement of the lever, the arms 140 and 141 may be separated against the force of the spring 145 to release the grip of the brake shoes on the brake wheel 139. An electrically operated solenoid coil 149 has an armature 150 connected by a link 151 to the end of the bell crank lever 147. The solenoid 149 is arranged so that upon energization thereof the armature 150 is drawn downwardly, as viewed in Fig. 2, to actuate the bell crank lever and release the grip of the brake shoes on the brake wheel 139. Thus the brake is arranged under the influence of the spring 145 to normally lock the shaft of the motor 135 against rotation so that, through the belts 137 and drum 18, movement of the cutter bands B is prevented. By energization of the solenoid 149, however, the brake on the motor is released so that the motor shaft may rotate, permitting actuation of the cutter bands B.

Although the manufacture of endless cutter bands has been considerably perfected so that they will operate for long periods of time without failure, it is important that when breakage does occur, the mechanism be arrested as quickly as possible. Therefore, in order to detect the breakage of a cutter band, the present invention provides safety controls and switches which are disposed adjacent both the upper and lower blade carrying drums 17 and 18 so as to be actuated in response to the movement of a broken blade around either drum. The safety controls comprise transversely extending rods 153 which are provided with laterally extending flange members 154 and are pivotally mounted between pointed pins 155 which are adjustably carried by brackets 156 carried by cross members 152 secured between the side frames 1 and 2. The flange members 154 are directed toward the surface of the particular upper or lower blade supporting drum adjacent which they are mounted and are in parallel relation with respect to such surface. The pointed pivots 155 are engaged in suitable sockets in the ends of the rods 153 and the adjustment of the pivots is such that very slight pressure is required against either side of one of the flange members 154 to displace the same and rotate one of the rods 153. At one end of each of the rods 153 is secured an arm 157 which has an angularly disposed finger 158 engaged by one end of a spring actuated arm 159 which actuates a mercury or other suitable switch 160, for the upper safety control and 161 for the lower safety control. The arrangement of the switches is such that when the spring actuated arms 159 are held depressed by the fingers 158 of the arms 157, an electric circuit is completed though the switches 160 and 161. Upon displacement of one of the flange members 154, as shown by the full lines of Fig. 9, the associated switch arm 159 is released by the finger 158 so that the arm moves upwardly under spring influence to actuate the switch and break the electrical circuit.

One method of utilizing the safety control is diagrammatically illustrated in Fig. 3, wherein the electrical power for actuating the motor 135 is derived from electrical power wires or conductors L1, L2 and L3. These wires lead to a magnetic switch 163 controlled by a magnetic or solenoid coil 164. One side of this coil is connected to conductor L1 and the other side is connected to conductor L3 by wires through manual switch 165 and safety switches 160 and 161. The switches 165, 160, and 161 are in series so that in order to energize the coil 164 to close the magnetic switch 163 all three switches, namely, 160, 161, and 165, must be closed. Upon energization of the coil 164 of the magnetic switch 163, the armature of the latter effects contact between the conductors L1, L2, and L3, and wires 166, 167, and 168, respectively, which energize the motor 135. Branches of the wires 167 and 168 are connected to the solenoid coil 149 which actuates the bell crank 147 and releases the brake arms 140 and 141 of the brake H, permitting the motor 135 to drive the drum 18 and bands B. If at any time one of the switches 160, 161, or 165 should be actuated to break the electrical circuit through the coil 164, the armature of the magnetic switch 163 automatically moves to disconnect the wires 166, 167, and 168 from the power conductors L1, L2, and L3, thus de-energizing the motor 135 and the brake solenoid 149. The brake shoes are thus applied to the brake wheel 139 under the pressure of the spring 145, bringing the drums 17 and 18 and the bands B to rest very quickly. By placing a safety release switch, such as the switches 160 and 161, adjacent each of the end drums 17 and 18, a very close control of the actuating mechanism is obtained so that upon the breaking of one of the bands, the mechanism is brought to a stop before the unbroken bands have travelled more than a few feet. This feature is of considerable importance since failure to stop the mechanism after a band is broken is apt to result in the breakage of additional bands because of the original broken band becoming entangled in the others. The resiliency of the bands is such that upon breaking thereof the portion of the band around one of the end drums 17 and 18 is thrown or expands radially, contacting and deflecting the flange member 154 of one of the safety control switches. Where but a single safety switch is employed in a device of this character, it sometimes occurs that such switch fails to operate and the damage intended to be avoided occurs. However, by providing a plurality of the safety switches in series, the probability that all of the safety switches will fail to function is very remote. It is to be noted that each of the safety switches 160 and 161 is subject to the influence of all of the bands, so that regardless of the band which breaks, either one or both of the safety switches may be actuated thereby. Reference is made to our copending application, Serial No. 400,270, filed June 28, 1941, for subject matter disclosed but not claimed herein.

Sliced articles are received from the bands B by the discharge conveyor F and forwarded thereover into the next instrumentality to operate on the articles; such, for example, as a wrapping machine (not shown). The conveyor F comprises a table or apron 170 which engages the underside of the articles and supports the same. A pair of spaced parallel endless side belts or chains 171 have their upper laps trained over the table 170 and at the ends of the conveyor are carried over rotatable members or sprockets 172 and 173, which are mounted on shafts 174 and 175, respectively, which are journalled in support members 176 carried by the side frames 1 and 2. Flights 177 are secured to and extend between the side belts 171 at uniform intervals and are arranged to be moved over the surface of the table 170 so as to engage the rear sides of the articles to forward the articles. The flights 177 of the discharge conveyor F are synchronized with the flights 7 of the feed conveyor by the common drive for the conveyors to be later described, so that an article is fed through the cutters B in advance of each of the flights 177. Guides 178 are provided at the sides of the conveyor F above the table 170 and in spaced parallel relation to one another. These guides engage the ends of the sliced articles to hold the same together as the articles are forwarded to the wrapping machine.

It is essential that the movement of articles through the slicing machine be synchronized with the cyclic operation of the machine which wraps the sliced articles. One of the most convenient methods of obtaining this synchronization is to drive the slicing machine conveyors by the wrapping machine. Such an arrangement is contemplated by the present invention and the numeral 180 indicates a chain driven by the wrapping machine and trained over a sprocket 181 secured on a shaft 182 journalled between the side frames of the slicing machine. The chain 180 is driven so that the shaft 182 rotates through a predetermined angular movement for each cycle of the wrapping machine, such, for example, as one revolution, which is contemplated for the arrangement shown in the drawings.

Figure 13:
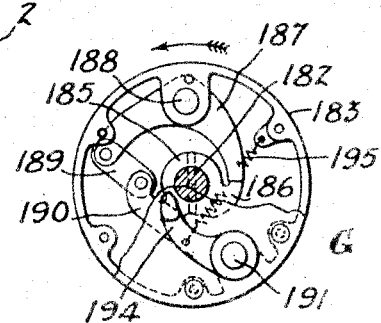
Fig. 13 is a view of the clutch structure, with parts broken away, taken substantially on the line 13—13 of Fig. 11.

Carried by the shaft 182 is a clutch structure which is part of the clutch arrangement G and comprises a drum-like housing 183 rotatable with respect to the shaft 182 and held against endwise movement by a collar 184 and a dog 185. The latter is secured on the shaft 182 for rotation therewith and has a radially projecting lug 186 (Fig. 13). Inside the housing 183 a crescent-shaped member 187 is pivoted adjacent its center on a pin 188 carried by the housing adjacent the periphery of the latter and parallel to the shaft 182. One end of the member 187 is connected by a link 189 to the free end of a lever 190 secured on pin 191 parallel to the shaft 182 and journalled in the housing 183. A cover plate 193 is secured over the open end of the housing 183 and is apertured to receive a projecting end of the pin 191, on which is secured an arm 194. A helical spring 195 is tensioned between a boss formed internally of the housing 183 and a midportion of the lever 190 so as to draw the latter in a clockwise direction, as viewed in Fig. 13, about the pin 191. This movement of the lever 190 pivots the member 187 so that the end thereof engages the finger 186 of the dog 185 to establish a driving connection between the shaft 182 and the clutch housing 183. In this manner the clutch is normally retained in engaged position under the influence of the spring 195.

A cone member 196 is axially slidable on the shaft 182 and the narrow end thereof is normally urged toward the clutch housing 183 by means of a helical compression spring 197 disposed about the shaft. The cone member 196 is engageable with the free end of the arm 194 to move the latter radially outward and thereby rotate the pin 191 which pivots the lever arm 190 in a counter-clockwise direction, as viewed in Fig. 13, to displace the crescent member 187 from its engaged position, thus releasing the dog 185, permitting the shaft 182 to rotate independently of the clutch housing 183.

Figure 12:
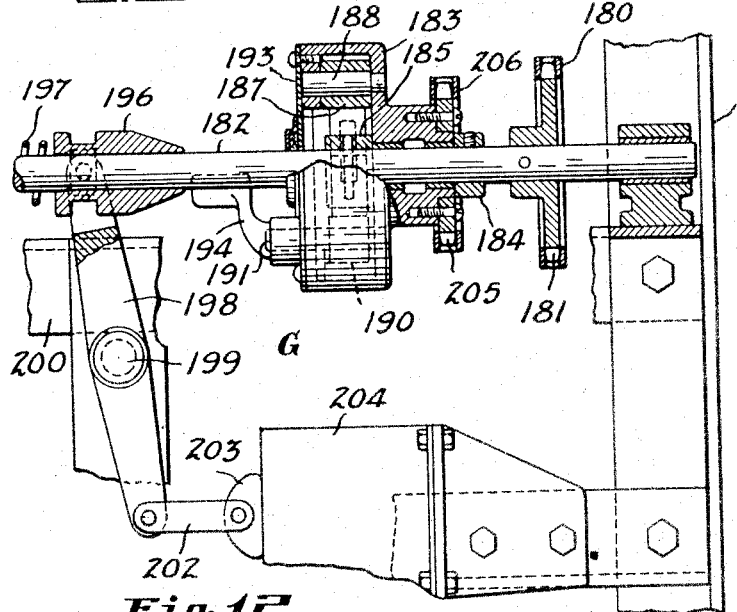
Fig. 12 is a fragmentary detail, partly in section and with parts broken away, showing the conveyor clutch and the actuating mechanism therefor, taken substantially on the line 12—12 of Fig. 2.

A beam 198 is pivoted at 199 adjacent its center to a cross member 200 of the slicing machine. The upper end of the beam 198 has a sliding connection with the cone member 196 which permits rotation of the latter with the shaft 182. The lower end of the beam 198 is pivotally connected to a link 202, the other end of which is connected to armature 203 of an electrical solenoid coil 204. Upon energization of the solenoid coil, the armature 203 is drawn to the right to substantially the position shown in Fig. 12. This movement of the armature pivots the beam 198 so as to withdraw the cone member 196 from engagement with the arm 194 of the clutch structure, permitting the spring 195 to draw the crescent member 187 into engagement with the lug 186 and re-establish the driving connection between the shaft 182 and the clutch housing. Conversely, upon de-energization of the solenoid 204, the spring 197 forces the cone member 196 into engagement with the arm 194 to disengage the clutch, this movement also withdrawing the solenoid armature 203 from the solenoid 204.

Carried by the clutch housing 183 and rotatable therewith is a sprocket 205 which drives a chain 206 trained over a sprocket 207 secured on a jack shaft 208, the latter being journalled in the side frames of the slicing machine. Intermediate shaft 209, journalled in the side frames, is driven from the jack shaft 208 by means of chain 210 and sprockets 211 and 212 on the shafts 208 and 209, respectively. The infeed conveyor C is driven from the intermediate shaft 209 by means of a chain 214 carried around sprocket 215 secured on the intermediate shaft 209 and a sprocket 216 secured on one end of the conveyor shaft 11. A chain 217 is trained over sprockets 218 and 219 secured on the jack shaft 208 and the shaft 175, respectively, of the discharge or forwarding conveyor F to drive the latter. Thus, both the infeed and discharge conveyors are provided with a drive which includes a common clutch structure, so that upon actuation of the clutch to disconnect the drive, both conveyors may be brought to a standstill at the same time.

Adjustably mounted on one of the conveyor support members 176 by means of elongated slots 220 and wing nuts 221 is an electrical switch 222 having an arm 223 which extends upwardly through a slot or opening in the apron or table 170 of the discharge conveyor. The upper end of the arm 223 is disposed in the path of the flights 177 and is arranged to be depressed by such flights as they pass thereover so as to actuate the switch 222 to break the electrical circuit therethrough for purposes to be hereinafter set forth.

Incorporated as an integral part of the present invention, although not entirely essential to all features thereof, is a control system whereby the drive for the conveyors and cutter bands may be regulated so as to obtain optimum performance, and the possibility of damage to the machine is minimized as well as avoiding danger to the operator thereof. In Fig. 3 is shown a relatively simple control system for connecting the safety switches 160 and 161 to control the operation of the motor 135 and the brake solenoid 149. In Fig. 17 is diagrammatically set forth the electrical controls preferably employed in the present invention. The power for operating the cutter bands B is supplied through the electrical conductors L1, L2, and L3, such as those previously mentioned in connection with Fig. 3. A master start contact button 225, normally open, is mounted at one side of the slicing machine adjacent the discharge conveyor F. One contact of this switch is connected to a branch of the conductor L3 and the other is connected by wires 226 in series with the safety stop switches 160 and 161 to one contact of a master stop contact button 227, normally closed, which is mounted at one side of the slicing machine on the frame thereof adjacent the infeed conveyor. The other contact of the master stop contact button 227 is connected by a wire 228 to one terminal or end of a magnetic or solenoid coil 229 of a magnetic switch 230. The other terminal of the solenoid coil 229 is connected to a branch of conductor L2. Therefore, upon pressing the master start button 225, the electrical circuit through the conductors L3, 226, 228 and L2 is completed through the solenoid coil 229, which actuates the spring pressed armature of the switch 230 to close a number of contacts. One contact 231 connects a branch of conductor L2 to one terminal or end of the brake solenoid 249 through a wire 232. The other terminal of the brake solenoid is connected directly to a branch of the conductor L3. Thus upon actuation of the magnetic switch 230, the brake solenoid 249 is actuated to release the arms 140 and 141 so as to free the motor and permit movement of the band blades. Another contact 234 shorts a wire 233 across the master start button 225 to maintain the circuit through the safety stop switches 160 and 161, conductors 226, master stop button switch 227, conductor 228, switch solenoid or holding coil 229, and conductor L2, after the master start button is released by the operator so as to maintain the energization of the solenoid 229. A third contact 235 of the switch 230 is connected by a wire 236 to one terminal of a magnetic solenoid coil 237 of a second magnetic switch 238. The other terminal or end of the solenoid 237 is connected to the conductor L2 through a thermal overload 239. The contactor 235 connects the wire 236 to a wire 240 which leads to one contact of a motor stop button switch 242, normally closed, and mounted at one side of the slicing machine frame adjacent the infeed conveyor end thereof. The other contact of the motor stop button 242 is connected by a wire 243 to one contact of a motor start button switch 244, normally open, and which is located above the motor stop button 242 on the side frame of the machine. The other contact of the motor start button is connected by a wire 245 to a terminal in the magnetic switch 238 which is connected to power conductor L3. Therefore, upon depressing the motor start button 244 an electrical circuit is completed from the conductor L3 through the wire 245, motor start button switch 244, wire 243, motor stop button switch 242, wire 240, contactor 235 of the magnetic switch 230, wire 236, magnetic coil 237 of the magnetic switch 238, thermal overload 239, and conductor L2. Thus energized, the solenoid 237 actuates the spring pressed armature of the switch 238 to close a number of contactors. One such contactor 246 connects a wire 247 in parallel relation across the contacts of the motor start button 244 so that when the latter is released the circuit through the solenoid 237 is maintained to keep the magnetic switch 238 closed. The other contacts 248, 249, and 250 connect the power conductors L1, L2, and L3 with the wires 252, 253, and 254, respectively, which lead to the motor 135 and energize the latter.

Branches of the wire 254 are connected, respectively, to one terminal of the clutch solenoid coil 204 and one terminal or end of a magnetic solenoid 255 of a third magnetic switch 256. Branches of the wire 253 are connected to a terminal 257 of the magnetic switch 256 and one terminal of a conveyor start button switch 258, normally open, and which is mounted on one side of the slicing machine adjacent the motor start switch 244. The other contact of the conveyor start button switch 258 is connected by a wire 259 to one terminal of the conveyor control switch 222, normally closed. A wire 260 extends from the other terminal of the conveyor switch 222 to one end of the magnetic coil 255 of the switch 256.

Until actuation of the magnetic switch 238 through energization of the solenoid 237 thereof in the manner previously described, actuation of the conveyor start button switch 258 is ineffective to energize the solenoid of the magnetic switch 256 which controls the conveyor clutch, as will later appear. As soon, however, as the switch 238 is actuated, an electrical current is made available from the power conductors L2 and L3 to the wires 253 and 254 so that depression of the conveyor start button 258 closes a circuit from conductor L2 through wire 253, conveyor start button 258, wire 259, conveyor switch 222, wires 260, switch solenoid 255, and wire 254, to the power conductor L3. The magnetic coil 255, thus energized, actuates the spring pressed armature of the switch 256 to move contactor 262 to establish a connection between the terminal 257 and terminal 263, to which is connected a wire 259. A branch of the wire 259 is connected to one side of the clutch solenoid 204 so that the latter is energized through the wires 259 and 254. Thus energized the clutch solenoid pivots the beam 198 to withdraw the cone member 196 from engagement with the arm 194, permitting the cresent member 187 to establish a drive connection with the dog 185. After the release of the conveyor start button 258, the energization of the switch solenoid 255 is maintained from the power conductors L2 and L3 through branches of the wires 254, 260, and 259, the latter being now connected to the conductor L2 through the contactor 262 of the switch 256 and a branch of the wire 253.

A pair of conveyor stop button switches 264 and 265 are connected by branches of wires 260 and 259 and a wire 266 in series across the terminals of the conveyor switch 222. The conveyor stop button switch 264, normally closed, is mounted on one side of the slicing machine adjacent the master start switch 225. The conveyor stop switch 265, normally closed, is mounted beneath the conveyor starting switch 258 on one side of the slicing machine frame at the infeed end of the slicer. In this manner the sustaining current for energizing the solenoid 255 of the magnetic switch 256 controlling the conveyor solenoid 204 is maintained by the conveyor stop switches 264 and 265, in series, as well as the conveyor switch 222. Thus, in order to interrupt the circuit for the magnetic coil 255, one of the conveyor stop button switches, which are normally closed, must be depressed at the same time that the conveyor switch 222 has been actuated or opened by one of the flights 177. Hence, when the operator desires to stop the conveyors, without stopping the bands B, one of the conveyor stop button switches must be held open until one of the flights moves into position to engage the arm 223 of the conveyor switch so as to open the latter.

In operating a slicing machine of the character described in connection with a wrapping machine, assuming that the two machines are connected so that the chain 180 is driven from the wrapping machine in the manner previously described and that both machines are idle, the operator first sets the wrapping machine in motion, which drives the chain 180 to rotate the shaft 182 so that the latter makes one revolution for each wrapping cycle of the wrapping machine. The master start button switch 225 is then depressed to energize the first magnetic switch 230 which releases the brake arrangement H by energization of the brake solenoid 149 through the contactor 231, and the bands B are free to rotate. The first magnetic switch 230 also makes current available to the circuit for energizing the holding coil 237 of the second magnetic switch 238.

It is to be noted that the master start switch 225 is disposed at the end of the slicer adjacent the discharge conveyor F so that the operator is required to leave his position adjacent the infeed conveyor C in order to start the machine. This makes it convenient for the operator to then inspect the connections between the wrapping machine and slicing machine to see that they are in proper order and promotes habits of carefulness on the part of the operator.

After release of the master start button 225, the sustaining current for the holding coil 229 of the switch 230 is maintained through the contactor 234. The operator then depresses motor start button switch 244, which energizes the holding coil 237 of the second magnetic switch 238 with electric current made available through contactor 235 of the first magnetic switch. The motor 135 which drives the blades B is thus energized through the wires 252, 253, and 254 by means of the contactors 248, 249, and 250, respectively, while the sustaining current for the holding coil 237 is continued through the contactor 246. The wires 253 and 254 after actuation of the magnetic switch 238 make current from the electrical power conductors L2 and L3 available for the third magnetic switch 256 which controls the clutch element G.

When the bands B have come up to their proper operating speed, which is preferably in the neighborhood of about 980 feet per minute, the conveyor start button switch 259 is depressed to energize the holding coil 255 of the third magnetic switch 256, so that the contactor 262 connects the wires 253 and 259, energizing the clutch solenoid 204, which permits the clutch arrangement G to establish a driving connection between the shaft 182 and the slicing machine conveyors when the latter are in proper synchronous relation with the shaft 182. After release of the conveyor start button 258, the sustaining current for the holding coil 255 is maintained through the conveyor switch 222 and the conveyor stop switches 264 and 265, the latter being in series with one another and in parallel with the conveyor switch 222.

During operation if the attendant should wish to stop the conveyors C and F without stopping the bands B—for example, to straighten or remove a loaf of bread—he can do so by depressing either the conveyor stop button 264 or the conveyor stop button switch 265 and holding the same depressed until one of the flights 177 has actuated the conveyor switch 222 to interrupt the sustaining current through the holding coil 255, which releases the armature of the switch 256, permitting the contactor 262 to interrupt the current in the circuit which energizes the clutch solenoid 204. The spring 197 on the shaft 182 then forces the cone member 196 into engagement with the clutch arm 194 to disconnect the conveyor drive in the manner previously described.

It is important that the conveyor F be stopped only after a flight thereof has completed a loaf delivery to the wrapping machine; otherwise, its movement might be inadvertently arrested when a loaf or other article being forwarded by the conveyor has been only partially transferred into the wrapping machine or onto the next succeeding conveyor, as the case may be. By the present invention an arrangement is provided whereby the discharge or forwarding conveyor F can only be stopped by the operator through actuation of the conveyor stop switches when the flights are in predetermined positions, depending upon the particular location of the arm 223 of switch 222.

Whenever it is desired to stop the entire slicing machine including the bands B and the conveyors C and F, the motor stop button switch 242 may be depressed to interrupt the sustaining current through the holding coil 237 of the magnetic switch 238. The armature of this switch thus released moves the contactors 248, 249, and 250 out of position, de-energizing the motor 135 and also de-energizing the sustaining current in the holding coil 255 of the third magnetic switch 256, so that the armature thereof is released to interrupt the current through the solenoid 204 of the clutch arrangement G, which permits disestablishment of the driving connection in the manner previously described. Stopping the bands and conveyors by means of the motor stop button switch does not interrupt the current through the holding coil 229 of the first magnetic switch 230. Accordingly, the brake solenoid 149 remains energized to keep the shoes carried by the arms 140 and 141 disengaged from the brake wheel 139, thus permitting the drums and blades B to coast to a stopping position.

In case of an emergency the operator can stop the blades and conveyors instantly by depressing the master stop switch button 227, which interrupts the current in the holding coil 229 of the first magnetic switch 230. Accordingly, the energizing current for the brake solenoid 139 is interrupted so that the brake arrangement H immediately stops the motor 135 and bands B, it being understood that the de-energizing of the holding coil 229 of the first magnetic switch also permits the spring pressed armature thereof to move the contactor 235 out of position so as to de-energize the holding coil 237 of the second magnetic switch 238. Hence, the motor 135 is de-energized simultaneously with the application of the brake H thereto and the clutch solenoid 204 is likewise simultaneously de-energized through interruption of current in the holding coil 255 of the third magnetic switch 256 to instantly stop the conveyors.

Instant stoppage of the blades and conveyors is similarly effected through actuation of either the safety stop switch 160 or the safety stop switch 161 by a broken band blade in the manner described above. After stoppage of the slicer through one of the safety stop switches, such switch must be reset with the finger 158 thereof engaged under the end of the spring pressed arm 159 before the machine can be again set in operation.

After stopping the blades and conveyors by means of one of the safety stop switches or the master stop switch, the slicer can only be set in operation again through actuation of the master start switch 225. However, after stopping the mechanisms by means of the motor stop switch 242, they can be again set in operation by means of the motor start switch 244.

To replace a band, the top end supporting drum 17 is moved toward the bottom drum 18 by operation of a crank inserted into the socket 63 of the blade tension adjustment through a hole in the side frame of the slicing machine. In this manner the tension in the remaining blades is released. A crank is then inserted successively in the sockets 76 through the side frame of the machine and the spindles 23 and 67 are rotated so as to be withdrawn from the sockets 25 and 71 of the stationary shafts 22 and 66. A new blade, first twisted to approximately the figure 8 shape it has during operation, may then be passed or threaded upwardly between the shafts which support the upper guide drums 77 and 78 and between the free end of the supporting drum 17 and the withdrawn end of the spindle 23. This upwardly threaded bight of the crossed blade is then looped over the end of the upper supporting drum and disposed flatwise against the surface thereof. In a similar manner the lower bight of the new blade is threaded downwardly between the shafts of the lower guide drums 79 and 80, past the free end of the lower supporting drum 18 (between the end thereof and the end of the withdrawn spindle 67) and looped over the end of the bottom supporting drum. The spindles 23 and 67 are then screwed back into place so as to firmly support the free ends of the shafts 22 and 66. The new blade is then adjusted in the guide fingers 84. If a central band is being replaced, all the bands between such band and the free end of the drum are moved over one place so that the new band is positioned at the end of the series. The operator then applies tension to the bands in the manner previously described by rotating the adjusting shaft 48 through a crank in the socket 63. As previously mentioned, the operator is unable because of the ratchet connection between the member 56 and pin 58 to apply more than a predetermined tension to the blades. Accordingly, no special skill is required to replace the broken blade and the mechanism can quickly be placed in operation after a stoppage because of a broken blade.

Because of the inherent danger in slicing machines of the band blade type, it is of considerable advantage that the operator can make most of the necessary adjustments on the outside of the machine without opening any of the enclosing panels (such as the panels 4 and 5 and the end panels not shown). For example, as indicated in Fig. 1, the socket 63, which adjusts the blade tension, is exposed and accessible even while the machine is in operation, if desired to tension the blades at that time. Similarly, the socket 111 into which a crank is inserted for adjusting the spacing of the runs of the cutters, is accessible through the side frame and panel of the machine on the same side thereof as the blade tensioning socket 63. In adjusting the blade spacing it is preferable that the bands be in operation so that they may be readily progressed over the surfaces of the supporting and guiding drums during the adjustment. Therefore, it is clear that the present arrangement, permitting the operator to make the adjustment in safety, is an important contribution to the art. As further shown in Fig. 4, the socket 131 in the bevel gear extension 103 for adjusting the distance between the upper blade spacing mechanism D and the lower blade spacing mechanism E is also accessible through the side frame and panels of the machine on the same side thereof as the sockets 63 and 111.

The present invention thus provides an improved band blade slicing machine in which the free or unsupported runs of the bands are all of substantially equal length so that the twisting stresses imposed upon the bands by crossing the same between the rotatable elements or members which support the bands are equally distributed in all unsupported portions of the bands. In this manner the life of the blades is materially increased and the control of the blades during the slicing operation is facilitated.

A unique control system is provided which reduces the likelihood of injury to the mechanism and operator thereof through breakage of one or more of the bands and which also controls the stopping and starting of the conveyor system so that the slicer may be advantageously used in connection with a wrapping machine.

The principles of the present invention may be utilized in numerous constructions, change being made with regard to the particular details shown as required, many modifications and alterations being contemplated, the particular embodiments shown being given for purposes of explanation and illustration.

What we claim is:

1. The combination in a bread slicing machine of cutter blades, electrical drive means for actuating the blades, conveyors for advancing unsliced bread loaves into the blades and for forwarding sliced bread loaves away from the blades, a drive for the conveyors including a clutch structure, electrical means for actuating said clutch to establish the conveyor drive, an electrical circuit including a switch for energizing the blade drive means, an electrical circuit for energizing the clutch actuating means, and an electrical switch common to both of said circuits to energize the same, said switch being located on the machine and subject to manual control.

2. The combination in a bread slicing machine of cutter blades, means for actuating the blades, a conveyor having flights thereon for receiving sliced bread loaves from the blades and forwarding the loaves away from the blades in spaced-apart relation, drive means for the conveyor including a shaft and a clutch on the shaft, said clutch when disengaged being adapted to reestablish a driving connection only at angularly spaced points in the revolution of said shaft which correspond to a movement of the conveyor equal to the distance between successive flights, electrical means for operating the clutch, a manually operable switch for controlling said electrical means, and means responsive to the movement of the flights to render the manual switch ineffective to influence the electrical means except during predetermined periods of flight movement.

3. A slicing machine comprising a pair of drums mounted in spaced parallel relation, cutter bands trained around the drums in side by side relation, shafts for the drums, support members for the shafts, mean for simultaneously moving the support members for one shaft toward and away from the support members for the other shaft to vary the distance between the drums and the tension in the bands, said means including rotatable members, one driven by another and common to all the support members for one shaft, and a slip clutch arranged to interrupt said drive at a predetermined torque.

4. A slicing machine comprising a supporting structure, a pair of spaced rotatable drums, bands trained around the drums in side by side relation, a shaft for one of the drums, support members for the shaft, said members being slidably mountted on the structure, rotatable threaded means for shifting the support members on the structure to vary the spacing of the drums and the tension in the blades, a rod for rotating the threaded means, a drive element connected to the rod for actuating the same, and a slip clutch interposed between the rod and element to arrest the actuation of the rod by the element at a predetermined torque.

5. In a slicing machine having a supporting structure and endless cutting bands carried by spaced rotatable members, means for adjustably supporting one of the members comprising a pair of support members slidable on the structure, rotatable elements carried by the structure and secured against endwise movement, a threaded connector between each element and one of the support members and arranged to shift the support members on the structure upon rotation of the elements, a rotatable rod drivingly connected to both elements, a drive element for actuating the rod, and a slip clutch interposed in the connection between the drive element and the rod.

6. In a slicing machine, a supporting structure, a pair of support members secured to the structure, a cylindrical aperture in one of the members, a spindle received in said aperture and guided by one portion of the walls thereof, said aperture being enlarged at one end to provide a shoulder around the guiding portion, a nut in the enlarged end of the aperture and seated against said shoulder, said nut having threaded engagement with the spindle to project and retract the spindle out of and into the aperture as the spindle is rotated relative to the nut, a shaft extending between the support members and having a socket in one end to receive the projected end of the spindle, and a substantially cylindrical drum on the shaft for carrying endless cutter bands.

7. The combination in a slicing machine having cutter blades and electric means for actuating the blades of an article advancing conveyor and electric means for driving the conveyor, an electrical circuit for energizing the blade actuating means and including an electric control switch, an electrical circuit for energizing the conveyor drive means and including an electric control switch, means including an electrical circuit for closing the blade actuating control switch, and means including an electrical circuit for closing the conveyor drive control switch, said last named circuit including a contactor of the blade actuating control switch which prevents energization of the conveyor drive control switch when the circut for the blade actuating means is deenergized.

8. In a slicing machine having cutter blades and actuating means therefor, a conveyor and drive means therefor, and a blade brake and governing means therefor, a control system which comprises means for releasing the brake, means subject to the releasing means for starting the blade actuating means, and means subject to the starting means for setting the conveyor drive means in motion.

9. In a slicing machine having cutter blades and actuating means therefor, a conveyor and drive means therefor, and a blade brake and governing means therefor, a control system which comprises means for releasing the brake, means subject to the releasing means for starting the blade actuating means, and means common to the releasing means, starting means and driving means to simultaneously stop the blade actuating means, stop the conveyor driving means and apply the brake.

10. In a slicing machine having cutter blades and actuating means therefor, an article conveyor and drive means therefor, said conveyor having spaced flights for individually engaging and advancing articles, means for stopping the conveyor drive only, said stopping means being arranged to stop the conveyor only in predetermined positions of the flights, and means for simultaneously stopping both the blade actuating means and the conveyor drive means irrespective of the position of the conveyor flights.

11. In a slicing machine having cutter blades and actuating means therefor, an article conveyor and drive means therefor, said conveyor having spaced flights for individually engaging and advancing articles, said drive means including an electrically operated clutch structure, an electric circuit for controlling said clutch structure, a manual switch in the circuit for causing engagement of the clutch to start the conveyor, a manual switch and a flight responsive switch in parallel in the circuit for causing disengagement of the clutch to stop the conveyor, said flight responsive switch being arranged to effect said disengagement only during predetermined positions of the conveyor flights.

12. In a slicing machine having movable cutter blades and electric actuating means therefor, a blade brake and an electric control means therefor, a conveyor and electric means controlling the drive thereof, and an electrical circuit for controlling the operation of said several means, said circuit including switch means for starting and stopping the actuating means, and switch means for simultaneously stopping the actuating means, operating the drive control means to stop the conveyor, and applying the brake to arrest the movement of the blades.

13. In a slicing machine, a frame structure, endless band cutters and means for supporting the same including a pair of spaced drums having the cutters trained thereover in side by side relation, and means for mounting the drums on the structure, said mounting means including spaced members guided on the structure for movement in parallelism with one another, elements carried by said members and having connection with one of the drums, one such element being a shaft connected at one end to one of the members for supporting the drum cantilever fashion during removal and replacement of band cutters and another element being a spindle mounted for endwise movement to engage the other end of the shaft to support the same during operation of the machine, threaded means interconnecting the frame structure and each of said members so that rotation of the threaded means moves the members on the frame structure, a rod rotatably supported by the frame on the outside of the paths of the band cutters, means for rotating the rod, and gear means connecting each of said threaded means and the rod so that rotation of the rod positively moves the several threaded means in unison to shift the several members simultaneously and said one drum laterally while maintaining the axis of such drum in predetermined relation to the axis of the other drum.

14. In a slicing machine, a frame structure, endless band cutters and means for supporting the same including a pair of spaced drums having the cutters trained thereover in side by side relation, and means for mounting the drums on the structure, said mounting means including spaced members guided on the structure for movement in parallelism with one another, elements carried by said members and having connection with one of the drums, threaded means interconnecting the frame structure and each of said members so that rotation of the threaded means moves the members on the frame structure, a rod rotatably supported by the frame, gear means connecting each of said threaded means and the rod so that rotation of the rod positively moves the several threaded means in unison to shift the several members simultaneously and said one drum laterally while maintaining the axis of such drum in predetermined relation to the axis of the other drum, a rotatable element carried by the frame, and a slip clutch drivingly connecting the rod and said rotatable element so that the rod can be thereby actuated to shift the one drum to establish a predetermined tension in the band cutters.

15. In a slicing machine having endless cutter bands and rotatable members for supporting the same, means for actuating at least one of the members to move the bands in continuous fashion, brake means for quickly stopping the cutter movement, conveyor means for advancing articles into the cutter bands to be sliced and drive means therefor including a clutch structure, and means for controlling the operation of the machine comprising means manually operative for releasing and applying the brake means to permit movement of the cutter bands or to stop the same, means manually operative for starting and stopping the cutter band actuating means, means manually operative for engaging and disengaging the conveyor drive clutch structure for starting and stopping the conveyor, and means interconnecting the several manually operative means for rendering the disengaging means responsive to the stopping means and the latter responsive to the applying means whereby manual operation of the brake applying means automatically stops the cutter band actuating means and disengages the clutch to stop the conveyor, and whereby manual operation of the stopping means to stop the actuation of the cutters, allowing the latter to continue in motion by inertia without application of the brake means, automatically disengages the clutch to stop the conveyor.

16. In a slicing machine having endless cutter bands and rotatable members for supporting the same, means for actuating at least one of the members to move the bands in continuous fashion, brake means for quickly stopping the cutter movement, conveyor means for advancing articles into the cutter bands to be sliced and drive means therefor including a clutch structure, and means for controlling the operation of the machine comprising means manually operative for releasing and applying the brake means to permit movement of the cutter bands or to stop the same, means manually operative for starting and stopping the cutter band actuating means, means manually operative for engaging and disengaging the conveyor drive clutch structure for starting and stopping the conveyor, and means interconnecting the several manually operative means for rendering the engaging and disengaging means responsive to the starting and stopping means and the latter responsive to the releasing and applying means so that manual operation of the brake releasing and applying means to apply the brake automatically operates the stopping means to stop the cutter actuating means and the disengaging means to disengage the conveyor drive clutch and so that manual operation of the engaging means is ineffective to engage said clutch proir to starting of the cutter band actuating means and manual operation of the starting means is ineffective to start the band actuating means prior to releasing of the cutter brake means.

17. In a slicing machine having endless cutter bands and rotatable members for supporting the same, means for actuating at least one of the members to move the bands in continuous fashion, brake means for quickly stopping movement of the cutters, conveyor means for advancing articles into the cutters, means for applying the brake and means for releasing the same, means for energizing the actuating means and means for de-energizing the same, means connecting the brake applying and releasing means and the energizing and de-energizing means to prevent energizing of the actuating means while the brake is applied and to automatically de-energize the actuating means upon applying the brake, means for driving the conveyor means, means for starting the driving means and means for stopping the same, and means connecting the energizing and de-energizing means and the starting and stopping means to prevent starting of the conveyor drive means while the actuating means is de-energized and to automatically stop the conveyor drive means upon de-energizing the actuating means.

18. In a slicing machine having movable cutters and electric means for actuating the same, brake means for quickly stopping the cutters when in motion, electric means for operating the brake means, a driven conveyor for moving articles through the machine, electric means controlling the drive for the conveyor, and an electrical circuit for governing the operation of the several electric means, said circuit including a first switch means common to the actuating means and the controlling means for simultaneously interrupting the cutter drive and the conveyor drive, and a second switch means for governing the operation of the brake means.

19. In a slicing machine having movable cutters and conveyor means, drive means for the cutters, brake means for the cutters, actuating means for the conveyor means, and control means including manually operable means for stopping the conveyor means while the cutters remain in motion, manually operable means for simultaneously stopping the conveyor means and arresting the cutter drive means, and manually operable means for simultaneously stopping the conveyor means, arresting the cutter drive means, and applying the brake means to stop the cutters.

20. In a slicing machine having a conveyor clutch actuating means, cutter blade driving means and blade brake operating means, a control system which comprises first governing means for the operating means, second governing means subject to the first governing means, and third governing means subject to the second governing means, each governing means being independently subject to manual control so that the incapacitance of any governing means automatically incapacitates the governing means subject thereto and so that no governing means may be capacitated until the governing means to which it is subject has been capacitated.

21. In a slicing machine having conveyor clutch electric actuating means, cutter blade electric driving means, and blade brake electric operating means, a control system which comprises a first relay for the operating means, a second relay governed by the first for the driving means, and a third relay governed by the second for the actuating means, said relays being arranged so that de-energization of any relay automatically de-energizes the relay subject to it and each governing relay must be energized before its subject relay may be energized, each relay being subject to de-energization by selective manual control.

ARTHUR A. KOTTMANN.
EARL C. VOLLMER.